(12) United States Patent
Weger

(10) Patent No.: US 9,223,881 B1
(45) Date of Patent: Dec. 29, 2015

(54) QUOTATION MANAGEMENT PLATFORM

(71) Applicant: Quotabelle, Inc., Fairfax, VA (US)

(72) Inventor: Pauline R. Weger, Fairfax, VA (US)

(73) Assignee: Quotabelle, Inc., Fairfax, VA (US)

( * ) Notice: Subject to any disclaimer, the term of this patent is extended or adjusted under 35 U.S.C. 154(b) by 0 days.

(21) Appl. No.: 14/540,153

(22) Filed: Nov. 13, 2014

(51) Int. Cl.
*G06F 17/30* (2006.01)

(52) U.S. Cl.
CPC .................. *G06F 17/30867* (2013.01)

(58) Field of Classification Search
USPC ........... 707/725, 769, 723, 758, 709; 715/738
See application file for complete search history.

(56) References Cited

U.S. PATENT DOCUMENTS

| | | | |
|---|---|---|---|
| 7,249,044 B2 * | 7/2007 | Kumar et al. ................ | 705/7.25 |
| 8,645,125 B2 | 2/2014 | Liang et al. ....................... | 704/9 |
| 2008/0183710 A1 * | 7/2008 | Serjeantson et al. ................... | G06F 17/2705 |
| 2009/0157490 A1 * | 6/2009 | Lawyer ........................... | 705/11 |
| 2009/0210404 A1 * | 8/2009 | Wilson ............................... | 707/5 |
| 2011/0197139 A1 * | 8/2011 | Huberman et al. ........... | 715/738 |
| 2011/0282860 A1 * | 11/2011 | Baarman et al. ............. | 707/709 |
| 2011/0289105 A1 * | 11/2011 | Hershowitz ................... | 707/769 |
| 2013/0159340 A1 * | 6/2013 | Blanco et al. ................. | 707/769 |
| 2013/0346401 A1 * | 12/2013 | Karidi et al. .................. | 707/723 |

* cited by examiner

*Primary Examiner* — Hung T Vy
(74) *Attorney, Agent, or Firm* — Sheppad Mullin Richter & Hampton LLP

(57) ABSTRACT

The invention relates to systems and methods for managing quotes. The system may facilitate a user search that relates one or more particular quotes, authors, categories of quotes, specific tag of a quote, and the like. A set of results may be provided based on a user search may be provided. A quote profile and an author profile may be generated providing information about a quote and an author respectively. A user profile page may display information including a user's favorite quotes.

27 Claims, 12 Drawing Sheets

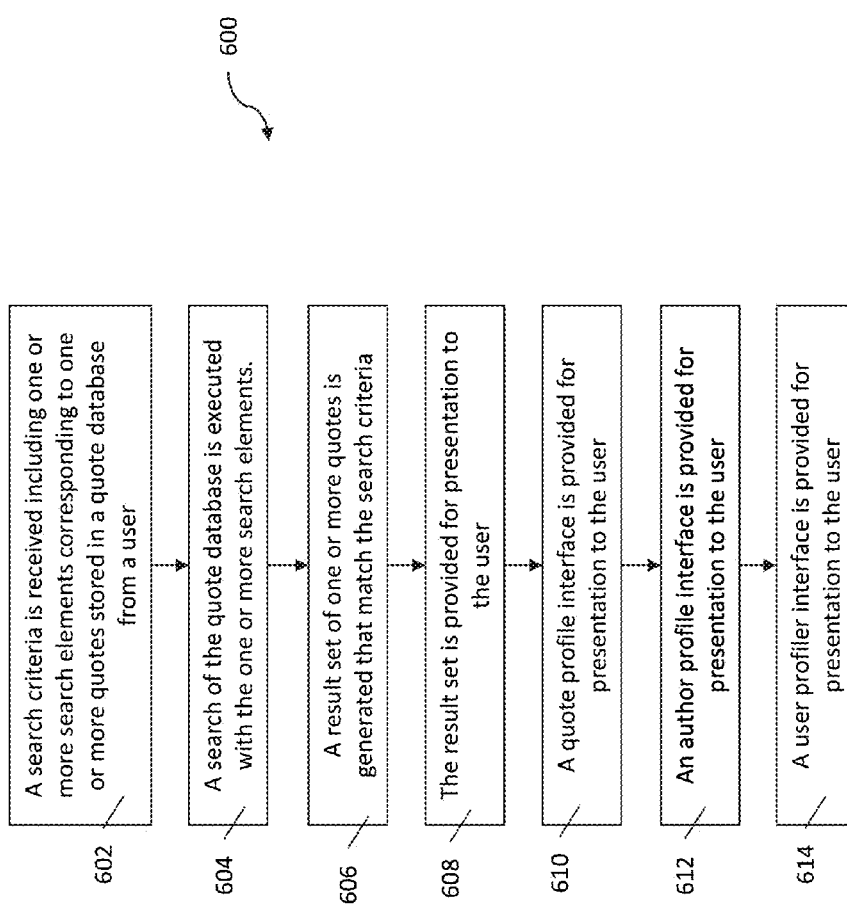

QUOTATION MANAGEMENT PLATFORM

FIELD OF THE INVENTION

The invention relates to systems and methods of managing quotations and assorted story assets.

BACKGROUND OF THE INVENTION

With the advent of technology, there's a mountain of information and resources available. Yet, it remains difficult to find relevant, memorable quotes from exceptional people that relate to particular events, themes, or occasions. Further, the sheer volume of content makes it increasingly difficult to find information about these exceptional people and share the stories of their lives. Beyond providing spiritual and cultural inspiration, quotations have been important in education and business, particularly as a part of ideation and innovation. More important than quotes themselves are the entrees they create to learning more about the exceptional people behind the words. Further, it is important that the events or occasions which relate to the quotes are also shared. They provide context and reveal the evolution of thinking for individuals and society. They become a snapshot of the times.

Many platforms and media companies exist which share and spread the social and economic impacts of exceptional people and events in society. However, many of these platforms and companies only provide limited content about the people and events themselves and their social and economic impacts. A need exists for a platform which manages quotations from these exceptional people and/or events which can also display their impact on society and tell their stories. There is value in content that exists in organizations and by sharing valuable content, such as quotations and story assets, individuals and organizations can support a commercial or social purpose. These and other drawbacks exist.

SUMMARY OF THE INVENTION

The invention relates to systems and methods of managing quotations and assorted story assets.

In an implementation, a user search that relates one or more particular quotes, authors, categories of quotes, specific tag of a quote, and the like may be received and processed. The user search may include a search parameter used to obtain search results. The user search may include, without limitation, a search request, a command (e.g., a structured set of words or phrases), and/or other input. The user search may be received via one or more input formats.

The user search may be processed to obtain results related to the user search. In an implementation, the user search may be processed using the exact words or phrases from the user search (e.g., using the exact words of the search parameter). In other implementations, the user search may be interpreted to determine user intent and then execute the search or command (or otherwise cause the search or command to be executed) based on the user intent.

A user search of quotation storage device may be processed utilizing one or more keywords, categories, author names and other search parameters. One or more search parameters may be analyzed to recognizing the inter-relationship between them. The search parameters and the characteristics of the inter-relationship associated with the search parameters may be utilized to retrieve accurate search results.

In an implementation, a set of results may be provided based on a user search. In one implementation, the set of results may be provided based on a prioritization which likely represents the interests of the user. In an implementation, the set of results may be prioritized based on history information indicating one or more search of the user. In an implementation, the set of results may be prioritized based on the user search itself In another implementation, for an author's name search, a user may be directed to an author's profile page containing all the relevant author information and quotes by the author. In another implementation, for a category search, a set of results may be provided displaying quotes related to the category in reverse chronological order based on era. In another implementation, for a category search, a list of quotes may be included which result from the search. The search results may include a quote profile for each resulting quote which includes the text of the quote, a comment function, a share function, a favorite function, author information and the like. In another implementation, one or more categories may be provided for a user to browse.

In one implementation, a quote profile may be generated for each quote. Each quote profile may display information relating to the quote including, but not limited to, actual quote text, quote date, category of quote, quote era, author of the quote, related descriptive words associated with each quote, images related to the quote, videos related to the quote, webpage links related to the quote and source of the quote, related author information, significant historical information associated with the quote, and the like. In another implementation, the quote profile may include one or more functions which enable a user to mark the quote as a favorite, share the quote, make the quote private, categorize the quote, and customize the appearance of the quote. In another implementation, the quote profile may include recommendations of other authors and quotes which share common views and values as the quote being viewed.

In one implementation, an author profile may be generated for each author of quote. Each author profile may display information related to the author including, but not limited to, the author's name, author's biography, birth date, death date/living, categories associated with the quote, related descriptive word associated with the author, other quotes related to or made by the author, images related to the author, videos related to the author, webpage links related to the author, related author information, significant historical information associated with the author, and the like.

In an implementation, a timeline may be generated for the author including featured quotes by the author; pictures, videos, audio of significant events in the author life. In one implementation, the timeline may be provided such that all of the elements associated with the timeline are mapped in a temporal manner.

In one implementation, a user profile page may be generated for each registered user. Each user profile may display information related to the user including, but not limited to favorite quotes, membership start date; functions attached to the quotes, and the like. In one implementation, a user profile includes a list of favorite quotes previously selected as a favorite by the user. Each favorite quote may include the actual quote text, author attribution, date added to favorite, a link to the quote page and/or author page, a share function and a customize function. In one implementation, the user profile page may include a collection of quotations. The collection of quotations may include public favorite quotes, private favorite quotes, personal quotes and proverbs, and the like.

In one implementation, a user may subscribe to a service which provides various quotes to the user. In one case, the user may subscribe to a service which provides quotes based on a selected theme and predetermined schedule. The service may recommend and provide quotes to the user. In another implementation, the scheduling function may provide an overall calendar to the user with the ability to customize a theme. The calendar may include recommended quotes associated with the theme as well as associated images. The scheduler may enable the user to subscribe to provide an automated calendar with key dates and relevant quotes preloaded for the user.

Various other aspects of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 6 depicts a process diagram for a process of managing quotations, according to an implementation of the invention.

DETAILED DESCRIPTION OF THE INVENTION

Figure 1:
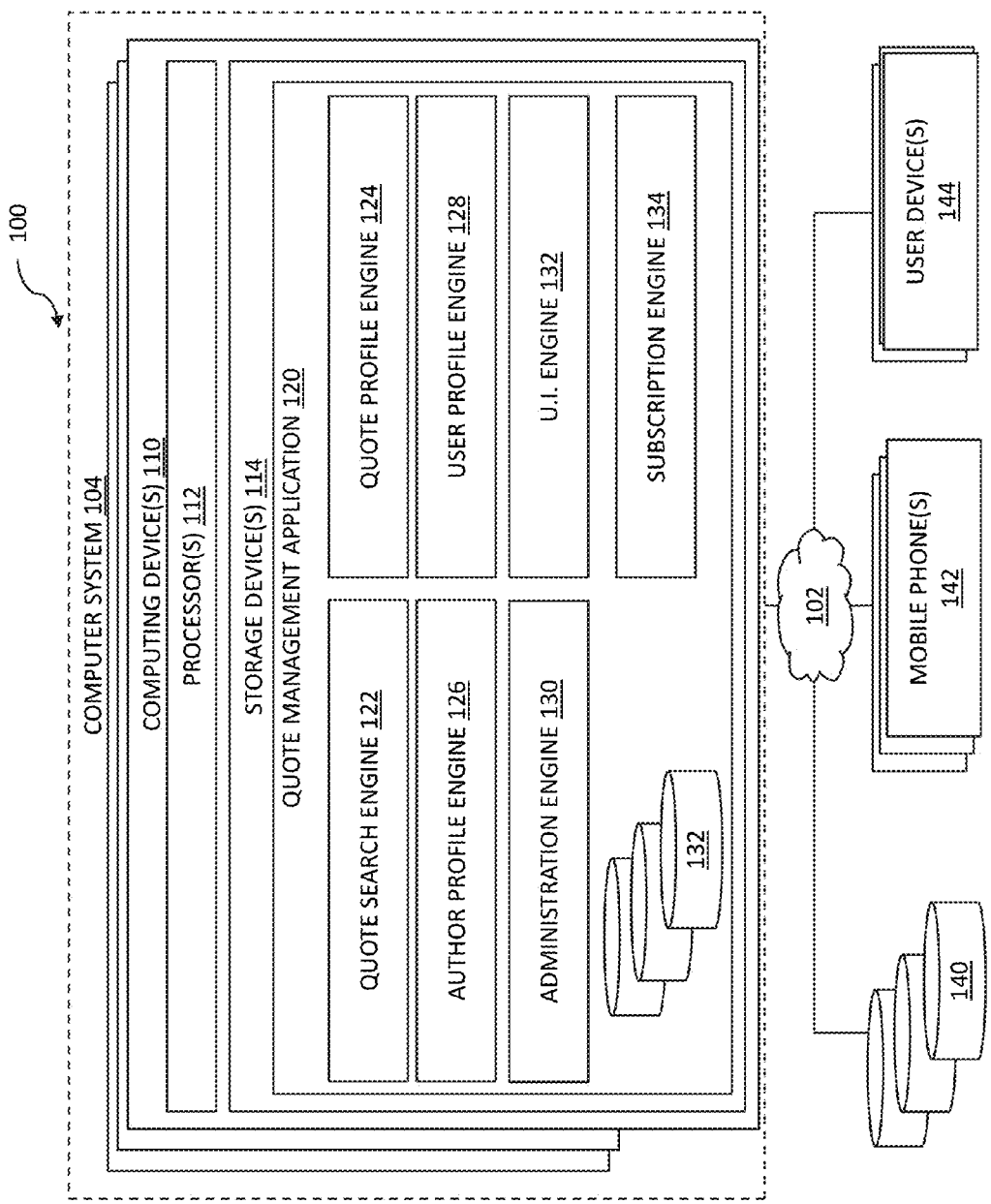
FIG. 1 illustrates a system for managing quotations, according to an implementation of the invention.

FIG. 1 illustrates a system 100 for managing quotations and assorted story assets, according to an implementation of the invention.

In an implementation, system 100 may receive and process a user search that relates one or more particular quotes, authors, categories of quotes, specific tag of a quote (i.e. themes, occasions, events, time era, etc.), and the like. The user search may include a search parameter used to obtain search results. The user search may include, without limitation, a search request, a command (e.g., a structured set of words or phrases), and/or other input. The user search may be received via one or more input formats. As used herein, a "quote" or "quotation" may comprise a quotation from a literary work such as a novel, poem, play, article, news item, song, etc. or a statement from a speech, presentation, etc. or from other source such as visuals, blogs, tweets, Instagram or Pinterest posts, speeches, videos, talks shows, live performances, etc. Further, as used herein, an "author" may comprise one or more people who wrote or spoke a quote (used in the novel, poem, play, article, news item, etc. or a statement from a speech, presentation, visuals, blogs, tweets, Instagram or Pinterest posts, speeches, videos, talks shows, songs, live performances, and the like.)

System 100 may process the user search to obtain results related to the user search. In an implementation, system 100 may process the user search using the exact words or phrases from the user search (e.g., using the exact words of the search parameter). In other implementations, system 100 may interpret the user search to determine user intent and then execute the search or command (or otherwise cause the search or command to be executed) based on the user intent.

System 100 may process a user search of quotation storage device utilizing one or more keywords, categories, author names and other search parameters. System 100 may analyze the one or more search parameters to recognizing the inter-relationship between them. System 100 may utilize the search parameters and the characteristics of the inter-relationship associated with the search parameters to retrieve accurate search results.

In an implementation, system 100 may provide a set of results based on a user search. In one implementation, system 100 may provide the set of results based on a prioritization which likely represents the interests of the user. In an implementation, system 100 may prioritize the set of results based on history information indicating one or more search of the user. In an implementation, system 100 may prioritize the set of results based on the user search itself In another implementation, for an author's name search, system 100 may direct a user to an author's profile page containing all the relevant author information and quotes by the author. In another implementation, for a category search, system 100 may provide a set of results displaying quotes related to the category in reverse chronological order based on era. In another implementation, for a category search, system 100 may include a list of quotes which result from the search. The search results may include a quote profile for each resulting quote which includes the text of the quote, a comment function, a share function, a favorite function, author information and the like. In another implementation, system 100 may provide one or more categories for a user to browse.

In one implementation, system 100 may generate a quote profile for each quote. Each quote profile may display information relating to the quote including, but not limited to, actual quote text, quote date, category of quote, quote era, author of the quote, related descriptive words associated with each quote, images related to the quote, audio, videos, and rich media files related to the quote, webpage links related to the quote and source of the quote, related author information, significant historical information associated with the quote, and the like. In another implementation, the quote profile may include one or more functions which enable a user to mark the quote as a favorite, share the quote, and customize the appearance of the quote. In another implementation, the quote profile may include recommendations of other authors and quotes which share common views and values as the quote being viewed. In another implementation, the quote profile may include one or more editorial sections which enable a contributor to publish content that provides more information or reveals more about the quote, context of the quotes, color commentary, and the like. For example, the quote profile may include the capability for contributors to publish additional information about a particular quote to be viewed by users of the system 100.

In one implementation, system 100 may generate an author profile for each author of quote. Each author profile may display information related to the author including, but not limited to, the author's name, author's biography, birth date, death date/living, categories associated with the quote, related descriptive word associated with the author, other quotes related to or made by the author, images related to the author, videos related to the author, webpage links related to the author, related author information, significant historical information associated with the author, and the like.

In an implementation, system 100 may generate a timeline of the author including featured quotes by the author; pictures, videos, audio, rich media files, and the like of significant events in the author life. In one implementation, system 100 may provide the timeline such that all of the elements associated with the timeline are mapped in a temporal manner.

In one implementation, system 100 may generate a user profile page for each registered user. Each user profile may display information related to the user including, but not limited to favorite quotes, membership start date; functions attached to the quotes, and the like. In one implementation, a user profile includes a list of favorite quotes previously selected as a favorite by the user. Each favorite quote may include the actual quote text, author attribution, date added to favorite, a link to the quote page and/or author page, a share function and a customize function.

Various examples used herein throughout may refer to examples of search results, although other uses and implementations of the system are contemplated and will be apparent to those having skill in the art using the disclosure herein. Having described a high level overview of some of the system functions, attention will now be turned to various system components that facilitate these and other functions.

System Components

System 100 may include a computer system 104, one or more databases 132, 140, one or more user devices 142, 144, and/or other components.

To facilitate these and other functions, computer system 104 may include one or more computing devices 110. Each computing device 110 may include one or more processors 112, one or more storage devices 114, and/or other components.

Processor(s) 112 may be programmed by one or more computer program instructions, which may be stored in storage device(s) 114. The one or more computer program instructions may include, without limitation, quote management application 120 accessible by one or more user devices 142, 144. Quote management application 120 may itself include different sets of instructions that each program the processor(s) 112 (and therefore computer system 104). For example, quote management application 120 may include a quote search engine 122, quote profile engine 124, author profile engine 126, administration engine 128, and/or administration engine 130 that program computer system 104. As used herein, for convenience, the various instructions will be described as performing an operation, when, in fact, the various instructions program computer system 104 to perform the operation.

Quote Management Application

In an implementation, quote management application 120 may receive and process a user search that relates one or more particular quotes, authors, categories of quotes, specific tag of a quote, and the like. The user search may include a search parameter used to obtain search results. For example, the search parameter may include one or more search terms (e.g., keywords, phrases, etc.), categories of quotes, authors, and/or other parameters used to search for or otherwise obtain information sought by a user. The user search may include, without limitation, a search request, a command (e.g., a structured set of words or phrases), and/or other input. The user search may be received via one or more input formats.

Quote management application 120 may process the user search to obtain results related to the user search. For example, quote management application 120 may execute a search that returns information related to the search parameter, execute a command that produces output related to the search parameter, or otherwise obtain results related to the search parameter. In an implementation, quote management engine 120 may process the user search using the exact words or phrases from the user search (e.g., using the exact words of the search parameter). For example, quote management engine 120 may execute a search or command (or otherwise cause the search or command to be executed) using the exact words of the search parameter as input by the user. In other implementations, quote management application 120 may interpret the user search to determine user intent and then execute the search or command (or otherwise cause the search or command to be executed) based on the user intent.

Quote management application 120 may process a user search of quotation storage device utilizing one or more keywords, categories, author names and other search parameters. Quote management application 120 may analyze the one or more search parameters to recognizing the inter-relationship between them. Quote management application 120 may utilize the search parameters and the characteristics of the inter-relationship associated with the search parameters to retrieve accurate search results.

In an implementation, quote management application 120 may provide a set of results based on a user search. In one implementation, quote management application 120 may provide the set of results based on a prioritization which likely represents the interests of the user. In an implementation, quote management application 120 may prioritize the set of results based on history information indicating one or more search of the user. In an implementation, quote management application 120 may prioritize the set of results based on the user search itself (e.g., a given set of results may be more related to intent of the user request compared to another set of results).

In another implementation, for an author's name search, quote management application 120 may direct a user to an author's profile page containing all the relevant author information and quotes by the author. In another implementation, for a category search, quote management application 120 may provide a set of results displaying quotes related to the category in reverse chronological order based on era. In another implementation, for a category search, quote management application 120 may include a list of quotes which result from the search. The search results may include a quote profile for each resulting quote which includes the text of the quote, a comment function, a share function, a favorite function, author information and the like.

In another implementation, quote management application 120 may provide one or more categories for a user to browse. For example, quote management application 120 may provide one or more quote descriptors which a user can select to browse quotes associated with a particular descriptor.

In one implementation, quote management application 120 may generate a quote profile for each quote. Each quote profile may display information relating to the quote including, but not limited to, actual quote text, quote date, category of quote, quote era, author of the quote, related descriptive words associated with each quote, images related to the quote, videos related to the quote, webpage links related to the quote and source of the quote, related author information, significant historical information associated with the quote, and the like. In another implementation, the quote profile may include one or more functions which enable a user to mark the quote as a favorite, share the quote, and customize the appearance of the quote. In another implementation, the quote profile may include recommendations of other authors and quotes which share common views and values as the quote being viewed.

In one implementation, quote management application 120 may generate an author profile for each author of quote. Each author profile may display information related to the author including, but not limited to, the author's name, author's biography, birth date, death date/living, categories associated with the quote, related descriptive word associated with the author, other quotes related to or made by the author, images related to the author, videos related to the author, webpage links related to the author, related author information, significant historical information associated with the author, and the like.

In an implementation, quote management application 120 may generate a timeline of the author including featured quotes by the author; pictures, videos, audio, rich media files, and the like of significant events in the author life. In one implementation, quote management application 120 may provide the timeline such that all of the elements associated with the timeline are mapped in a temporal manner.

In an implementation, quote management application 120 may register a user to use the system. For example, quote management application 120 may obtain user profile information of a user that includes user information and settings. The user profile information may include, for example, user preference information, a list of favorite quotes, and/or other user information. In one implementation, quote management application 120 may generate a user profile page for each registered user. Each user profile may display information related to the user including, but not limited to favorite quotes, membership start date; functions attached to the quotes, and the like. In one implementation, a user profile includes a list of favorite quotes previously selected as a favorite by the user. Each favorite quote may include the actual quote text, author attribution, date added to favorite, a link to the quote page and/or author page, a share function and a customize function. In one implementation, the user profile page may include a collection of quotations. The collection of quotations may include public favorite quotes, private favorite quotes, personal quotes and proverbs, and the like. In another implementation, the user may customize and manage the collection of quotations including the addition of quotes, sorting of quotes, tagging of quotes, scheduling to provide quotes, the public/private status of quotes, and the like. For example, the user may manage the collection of quotes to be sorted by a particular category, era, author and the like. The user may further manage the collections to be provided to the user as a reminder or motivation on the user device according to a schedule or recommendation by the system.

Having described high level functions and operations of quote management application 120, attention will now be turned to particular functions and operations of quote management application 120 as illustrated through its various instructions. The various instructions (e.g., quote search engine 122, quote profile engine 124, author profile engine 126, administration engine 128, and/or administration engine 130.) of quote management application 120 are described individually as discreet sets of instructions by way of illustration and not limitation, as two or more of the instructions may be combined.

Indexing and Searching of a Quotation Database

In an implementation, quote search engine 122 may obtain results related to a user search that are available from a quotation storage device 140, which may be stored as a remote storage device. Quotation storage device 140 may store one or more quotes attributed to one or more authors. As used herein, a "quote" or "quotation" may comprise a quotation from a literary work such as a novel, poem, play, article, news item, etc. or a statement from a speech, presentation, etc. or from other source such as visuals, blogs, tweets, Instagram or Pinterest posts, speeches, videos, talks shows, songs, live performances, etc. Further, as used herein, an "author" may comprise one or more people who wrote or spoke a quote (used in the novel, poem, play, article, news item, etc. or a statement from a speech, presentation, visuals, blogs, tweets, Instagram or Pinterest posts, speeches, videos, talks shows, songs live performances, and the like.) Quotation storage device 140 may also store one or more story assets including information, links, videos, pictures, audio, rich media files, and the like which relate to the one or more quotes and/or authors. The quotation storage device 140 may include databases that are accessible to computer system 104 via a remote or external network connection (e.g., outside of a firewall), such as the Internet. For example, the quotation storage device 140 may include a storage device that is remotely accessible to computer system 104. In another embodiment, the quotation storage device may include one or more internal databases 132 that are internally accessible to the computer system 104. In this manner, quote search engine 122 may search the quotation storage device 140 to obtain results related to the user search.

In an implementation, quote search engine 122 may index the quotation storage device 140 (or designated portions) for efficient searching. Such indices may be arranged according to type of file (e.g., photos, videos, documents, etc.), disk partition, solid state blocks, and/or other characteristic. Quote search 122 may index the quote database 132 based on user settings obtained during a user registration process, where a user may specify types of files to index, partitions/blocks to index, and/or other parameter that may specify information to index. Quote search may also index the quote database 132 based on attributes of the stored quotes such as the authors, quote category, quote tags, and/or other quote attributes.

Whether or not the quotation storage device 140 is indexed, quote search engine 122 may search the quote database in response to a user request. In an implementation, quote search engine 122 may receive and process a user search that relates one or more particular quotes, authors, categories of quotes, specific tag of a quote, and the like. The user search may include a search parameter used to obtain search results. For example, the search parameter may include one or more search terms (e.g., keywords, phrases, etc.), categories of quotes, authors, and/or other parameters used to search for or otherwise obtain information sought by a user. The user search may include, without limitation, a search request, a command (e.g., a structured set of words or phrases), and/or other input. The user search may be received via one or more input formats.

In an implementation, quote search engine 122 may process the user search to obtain results related to the user search. For example, quote management application 120 may execute a search that returns information related to the search parameter, execute a command that produces output related to the search parameter, or otherwise obtain results related to the search parameter. In an implementation, quote search engine 122 may process the user search using the exact words or phrases from the user search (e.g., using the exact words of the search parameter). In another implementation, quote search engine 122 may execute a search or command (or otherwise cause the search or command to be executed) using the exact words of the search parameter as input by the user. For example, the user search may include a search request that includes a search parameter "Amelia Earhart." Quote search 122 may search the quote database with quotes or other information relating to "Amelia Earhart." Quote search 122 may search the quote database utilizing the exact words for quotes or other information related to "Amelia Earhart." For instance, quote search 122 may identify one or more quotes and/or information authored by Amelia Earhart.

In other implementations, quote search engine 122 may interpret the user search to determine user intent and then execute the search or command (or otherwise cause the search or command to be executed) based on the user intent. For example, a user search including a search parameter "Amelia Earhart" may identify one or more quotes and/or information which mention or relate to Amelia Earhart. In an implementation, quote search engine 122 may categorize the set of results available at the quotation storage device 140. For example, quotation storage device 140 may categorizes files related to "Amelia Earhart" into quotes and/or information authored by Amelia Earhart, related to Amelia Earhart, mentioning Amelia Earhart and/or other information related to Amelia Earhart.

In an exemplary implementation, quote search engine 122 may process a user search of quotation storage device 140 via keyword search, categorical search, and/or author name search for one or more quotes. During the search, quote search engine 122 may search for quotes by entering a specific author's or speaker's name. If there are multiple authors with the same last name, quote search engine 122 may enable user to select from a list of authors in alphabetical order by first name to ensure the search results are accurate. If there are multiple authors with the same first and last name, quote search engine 122 may enables the user to select from a list of related descriptive words to ensure search results are accurate. In one implementation, a search by author name will results in an author profile page containing all author related materials as well as all quotes by author. In another exemplary implementation, quote search engine 122 may search for quotes by quote category. For instance, one or more categories may be associated with a quote. For example, quote categories may include, but are not limited to, era, emotion, subject matter, geography, social community role, and other categories.

In another implementation, quote search engine 122 may process a user search of quotation storage device 140 utilizing one or more keywords, categories, author names and other search parameters. Quote search engine 122 may analyze the one or more search parameters to recognizing the inter-relationship between them. The quote search engine 122 may utilize the search parameters and the characteristics of the inter-relationship associated with the search parameters to retrieve accurate search results.

In one implementation, the user search may be received via the user device 144 such as a mobile phone 142. For example, the quote search engine 122 may receive a user search inputted by the user into a user device 144. In another implementation, the quote search engine 122 may receive a user search automatically generated by quote search engine 122. In one case, quote search engine 122 may automatically generate a user search based off an action or input of the user device 144. For example, a user may take a picture of a quote using a camera of a mobile phone 142 which is then provided to the quote search engine 122. The user profile engine 128 may analyze the picture to recognize text within the picture. The recognized text may then be utilized by user profile engine 128 to automatically generate a user search related to the text within the picture. Quote search engine 122 may utilize the user search to identify the quote within the picture and/or obtain results related to the text within the picture.

Quotation Database Search Results

In an implementation, quote search engine 122 may provide a set of results based on a user search. In one implementation, the quote search engine 122 may provide the set of results based on a prioritization which likely represents the interests of the user. For example, a higher-priority set of results may be more likely to be of interest to a user than a lower-priority set of results. The prioritization criteria may include, without limitation, preference information associated with the user, history information indicating one or more search of the user, the user search (e.g., a given set of results may be more related to an intent of the user request compared to another set of results), and/or other criteria. For instance, a given user may select the different formats in which search results are displayed. For example, quote search engine 122 may enable a user to separate the set of results by the types of results being displayed (quote, author, category, etc.). In another implementation, the set of results may be sortable and filterable by category, author, date, and the like. In another implementation, the quote search engine 122 may enable the user to also select or sort the set of results by a length of quote (short vs. long quotes).

In an implementation, search engine 122 may prioritize the set of results based on history information indicating one or more search of the user. The one or more actions of the user may indicate the relevance of/user interest in a given set of results. The one or more actions may include, without limitation, a historical level of interactivity by the user with sets of results previously presented to the user, a historical browsing history of the user, and/or other actions of the user.

In an implementation, quote search engine 122 may prioritize the set of results based on the user search itself (e.g., a given set of results may be more related to intent of the user request compared to another set of results). For example and without limitation, search engine 122 may determine that a user search is related to an author. In this example, the user may intend to obtain information related specifically to authors. In another implementation, the set of results may be presented to the user based on the user preference. For example, if the user prefers the results to be sorted or organized in the particular manner.

In another implementation, for an author's name search, quote search engine 122 may direct a user to an author's profile page containing all the relevant author information and quotes by the author. In another implementation, for a category search, quote search engine 122 may provide a set of results displaying quotes related to the category in reverse chronological order based on era. Similarly, in another implementation, the quote engine 122 may direct a user to a quote profile page in response to the user search. For example, if a user search contains words or phrases associated with a quote, the quote search engine 122 may direct the user to the quote profile pages for the quote with the highest likelihood of being associated with the words or phrases.

In another implementation, for a category search, quote search engine 122 may include a list of quotes which result from the search. The search results may include a quote profile for each resulting quote which includes the text of the quote, a comment function, a share function, a favorite function, author information and the like.

In another implementation, quote search engine 122 may provide one or more categories or themes for a user to browse. For example, quote search engine 122 may provide one or more quote descriptors which a user can select to browse quotes associated with a particular descriptor. For instance, a user may select the descriptor "kindness" and a list of quotes which are associated with the descriptor "kindness" may be displayed for the user to browse. In another implementation, quote search engine 122 may provide starting points or categories or themes to assist the user in browsing. The starting points or categories may include authors, quote categories, featured quotes, and the like. For example, if a user selects the "believe" descriptors, a starting point including a list of unforgettable authors, remarkable authors, and notable authors may be provided along with relevant authors which are associated with the believe category.

Quote Profile

In one implementation, quote profile engine 124 may generate a quote profile for each quote. Each quote profile may display information relating to the quote including, but not limited to, actual quote text, quote date, category of quote, quote era, author of the quote, related descriptive words associated with each quote, images related to the quote, videos related to the quote, webpage links related to the quote and source of the quote, related author information, significant historical information associated with the quote, and the like. For example, a quote from Eleanor Roosevelt may include the actual quote, the date and era the quote was made, image and videos related to the quote and where it was made (location, event, etc.), the source of quote, other historical information related to the quote, and category of the quote.

In another implementation, the quote profile may include one or more functions which enable a user to mark the quote as a favorite, share the quote, and customize the appearance of the quote. In another implementation, the quote profile may include recommendations of other authors and quotes which share common views and values as the quote being viewed.

For example, quote profile engine may generate a quote profile including the text of the quote, the author of the quote, a link to the story of the author via the author profile, a link to more quotes by the author, and the like. In one implementation, the quote profile may also include recommendations of other authors and quotes which share common views and values as the quote being viewed. In another implementation, the quote profile may provide an author information region that may include other quotes by the author, links to significant and/or historical events associated with the author including pictures, video, audio, rich media files, and categories associated with the author.

In another implementation, the quote profile may include one or more editorial sections which enable a contributor to publish content that provide more information or reveals more about the quote, context of the quotes, color commentary, and the like. For example, the quote profile may include the capability for contributors to publish additional information about a particular quote to be viewed by users of the system.

Author Profile

In one implementation, author profile engine 126 may generate an author profile for each author of quote. Each author profile may display information related to the author including, but not limited to, the author's name, author's biography, birth date, death date/living, categories associated with the quote, related descriptive word associated with the author, other quotes related to or made by the author, images related to the author, videos related to the author, webpage links related to the author, related author information, significant historical information associated with the author, and the like. In one implementation, the author profile may include a quote archive including all of the quotes attributed the author. In another implementation, the author profile may include recommendations of other authors and quotes which share common views and values as the author being viewed.

In an implementation, author profile engine 126 may generate a timeline of the author including featured quotes by the author; pictures, videos, audio, rich media files, and the like of significant events in the author life. In one implementation, author profile engine 126 may provide the timeline such that all of the elements associated with the timeline are mapped in a temporal manner. For example, a timeline for Madeleine Albright may include featured quotes, pictures and videos of historical events associated with her life, audio of speeches in which a feature quote is made; and links to other biographical and historical information.

In another implementation, author profile engine 126 may include items or links to items which are favored or made famous by the author and/or helps tell the story of the life of the author. In another implementation, author profile engine 126 may include the ability of the user to purchase one or more of these items. In one implementation, the items or links of items may include links to affiliate merchants in which the items can be purchased. In another implementation, the items or links may include custom and/or on demand items which can be purchased by the user.

For example, author profile engine 126 may generate an author profile including the name of the author, the author's biography, one or more pictures of the author, categories associated with the author, list of quotes made by the author, related authors, and the like. In one implementation, the author profile may include a timeline including the significant dates and events in the author's life and media elements and links associated with those events. In another implementation, the author profile may provide items or links to items which are favored or made famous by the author and/or helps tell the story of the life of the author.

In another implementation, the author profile may include one or more editorial sections which enable a contributor to publish content that provide more information or reveals more about the author, context of the author, color commentary, and the like. For example, the author profile may include the capability for contributors to publish additional information about a particular author to be viewed by users of the system.

Registering Users and User Profile

In an implementation, user profile engine 128 may register a user to use the system. For example, quote management application 120 may obtain user profile information of a user that includes user information and settings. The user profile information may include, for example, user preference information, a list of favorite quotes, and/or other user information. The user profile information may be stored in one or more databases, such as a database 132.

In one implementation, user profile engine 128 may generate a user profile page for each registered user. Each user profile may display information related to the user including, but not limited to favorite quotes, membership start date; functions attached to the quotes, and the like. In one implementation, a user profile includes a list of favorite quotes previously selected as a favorite by the user. Each favorite quote may include the actual quote text, author attribution, date added to favorite, a link to the quote page and/or author page, a share function and a customize function. In one implementation, each quote include a link to see what other users have selected the quote as a favorite.

For example, when viewing a quote, a user has the ability to mark it as a "favorite" by clicking a button to be saved and later viewed in the "My Favorite Quotes" section of the user profile. Once a quote is saved as a favorite, it becomes available in the Saved Favorite Quotes section and is shareable with other guests and via social media. All favorite quotes will be visible in reverse chronological order on the page. In one implementation, the user profile page may include a collection of quotations. The collection of quotations may include public favorite quotes, private favorite quotes, personal quotes and proverbs, and the like. In another implementation, the user may customize and manage the collection of quotations including the addition of quotes, sorting of quotes, tagging of quotes, scheduling to provide quotes, the public/private status of quotes, and the like. For example, the user may manage the collection of quotes to be sorted by a particular category, era, author and the like. The user may further manage the collections to be provided to the user as a reminder or motivation on the user device according to a schedule or recommendation by the system.

In one implementation, the quotes are provided in reverse chronological order based on the add date to the user's favorites. However, it should be appreciated that the order in which the quotes are provided may vary. In another implementation, the user profile engine 128 enables the user to select which quotes are publicly viewable. In another implementation, the quotes may be organized by category or theme, occasion, author, and the like to create a quote collection.

In another implementation, user profile engine 128 may customize the appearance of the quote. For example, a user may customize the font, color, size, background, and the like of favorite quotes on the user profile. In another implementation, the user can share the customized favorite quotes via a sharing function to social media sites and to others via email. In one implementation, the user profile engine 128 may customize the background of a quote to include an image selected by the user. In one implementation, the image may be a pre-stored image. In another implementation, the image may be uploaded by the user. In another implementation, pre-sized templates enable the user to modify the image according to various parameters associated with social media standards (i.e. Instagram, Facebook, Twitter).

For example, user profile engine 128 may generate user profile including a favorite quote region which display all of the quotes marked as favorites by the user. In one implementation, the user profile may include quote profiles for each quote marked as a favorite. In another implementation, the user profile may include user customization of the quotes to alter their appearance and style. In another implementation, the user profile may share one or more of the favorite quotes on social media.

In another implementation, user profile engine 128 may receive submission of new quotes from users. In one implementation, user profile engine 128 may provide the ability for user to add quotes. For example, user profile engine 128 may enable a user to add one or more profiles to the quote storage device. In one implementation, a user may input information relating to the quote to be added including the quote text, quote era, quote author, quote source, URL with the quote, and other information associated with the quote and author. User profile engine 128 may provide feedback to the user relating to the new quote submission by indicating that the quote has been submitted for the administration approval process and the like. In one implementation, the user profile engine 128 may analyze the new quote submission to determine whether the quote is already stored within the quote database.

In another implementation, user profile engine 128 may include provide analytics directed to the system. For example, the user profile engine 128 may provide real-time access to performance data of the user profile page. In this case, the user can determined which types of quotes and information is being consumed by the most users.

Administration Tools

In an implementation, administration engine 130 may manage the quote management application 120. In one implementation, administration engine 130 may manage user profiles associated with the one or more users. For example, administration engine 130 may enable an administrator to edit user profiles including the name, email address, username, membership status, and number of submitted quotes accepted/rejected/and displays for a particular user.

In another implementation, administration engine 130 may moderate a quote profile associated with one or more quotes. For example, administration engine 130 may enable an administrator to add a new quote, tag or categorize a quote, add viewing and descriptors to a quote, edit information relating to the quote including, but not limited to, text, author, era, source, tag, category, data, media, source, related words, and the like.

In another implementation, administration engine 130 may moderate an author profile associated with an author. For example, administration engine 130 may add a new author, add quotes attributed to the author, add media, personal affect, and links to an author, modify the timeline of an author, add photos and videos to an author, and the like.

In another implementation, administration engine 130 may include provide analytics directed to the system. For example, the administration engine 130 may provide real-time access to performance data of one or more of the quotes and/or author pages. In this case, the administrator can determined which types of quotes and information is being consumed by the most users. In another implementation, the administration engine 130 may generate one or more reports which report the engagement of users including reports gauging the interest of user, performance of various aspects of the system, and information associated with the commerce of the system.

Generating and Displaying Interfaces

In an implementation, user interface engine 132 may generate one or more interfaces that present various functions of the quote management application 120. In one implementation, user interface engine 132 may generate one or more browsing interfaces for quote search engine 122. In another implementation, user interface engine 132 may generate one or more quote profile interfaces for quote profile engine 124. In another implementation, user interface engine 132 may generate one or more author profile interfaces for author profile engine 126. In another implementation, user interface engine 132 may generate one or more user profile interfaces for user profile engine 128. In another implementation, user interface engine 132 may generate one or more administration interfaces for administration engine 130. In one implementation, user interface engine 132 may generate a user customizable widget. For example, the user interface engine 132 may generate a widget which may include backgrounds, preferred quote categories (by author, era, occasion, and the like) and sizes selected by a user to download to a blog or website.

Quote Based Subscription and Calendar

In an implementation, subscription engine 134 may permit a user to subscribe to a service which provides various quotes to the user. In one case, the user may subscribe to a service which provides quotes based on a selected theme and predetermined schedule. The subscription engine 134 may utilize the functionality of the quote search engine 122 to recommend and provide quotes to the user. For example, if the user subscribed a "fitness" theme service, subscription engine 134 may provide the user "fitness" themed quotes at a predetermined time such as 7 AM every morning while the user is working out. In another implementation, the subscription engine 134 may provide the quotes based on an action or trigger of a user device. For example, subscription engine 134 may provide motivational quotes in response to a user's alarm going off on their mobile phone in the morning. In another implementation, subscription engine 124 may provide the quotes based on a performance metrics among target user audiences (i.e. Twitter enthusiasts engaged at X time, Facebook publishing best at X time, etc.)

In another implementation, subscription engine 134 may provide an overall calendar to the user with the ability to customize a theme. The calendar may include recommended quotes associated with the theme as well as associated images. The subscription engine 134 may enables the user to subscribe to provide an automated calendar with key dates and relevant quotes pre-loaded for the user. For example, subscription engine 24 may utilize the user calendar (i.e. Outlook) to determine key dates within a user calendar and generate a calendar for the user including quotes and images.

Examples of System Architectures and Configurations

Different system architectures may be used. For example, all or a portion of quote management application 120 may be executed on a user device. In other words, computing device 110 as illustrated may include a user device operated by the user. In implementations where all or a portion of quote management application 120 is executed on the user device, the user device may search quotation storage device, obtain sets of results, generate the various interface, and/or perform other functions/operations of quote management application 120.

All or a portion of quote management application 120 may be executed on a server device. In other words, computing device 110 as illustrated may include a server device that obtains a user request from a user device operated by the user. In implementations where all or a portion of quote management application 120 is executed on the server device, the server device may search quote database (or cause a search of a local information source), initiate searches on quote database, obtain sets of results, generate the quote and/or author profiles, and/or perform other functions/operations of quote management application 120.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary Interfaces

Figure 2A:
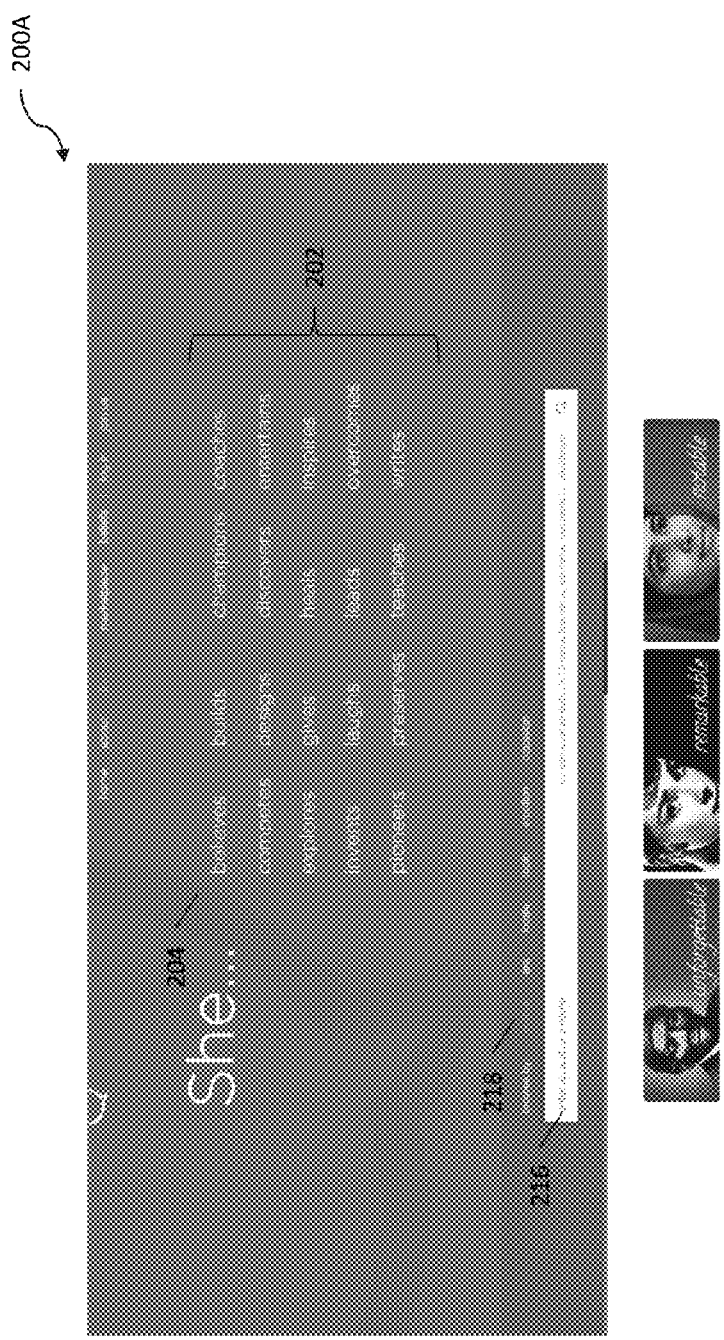
FIG. 2A depicts an example of a browsing interface for providing quote searching and browsing, according to an implementation of the invention.

FIG. 2A depicts an example of a browsing interface 200A for providing quote searching and browsing, according to an implementation of the invention. A browsing region 202 may display one or more quote descriptors (categories, themes, etc.) 204 which a user may select to browse quotes associated with a particular descriptor. For instance, a user may select the descriptor "believes" and a list of quotes which are associated with the descriptor "believes" may be displayed for the user to browse. In another implementation, the browsing region 202 may provide starting points for the user's browsing session after selection of a descriptor.

Figure 2B:
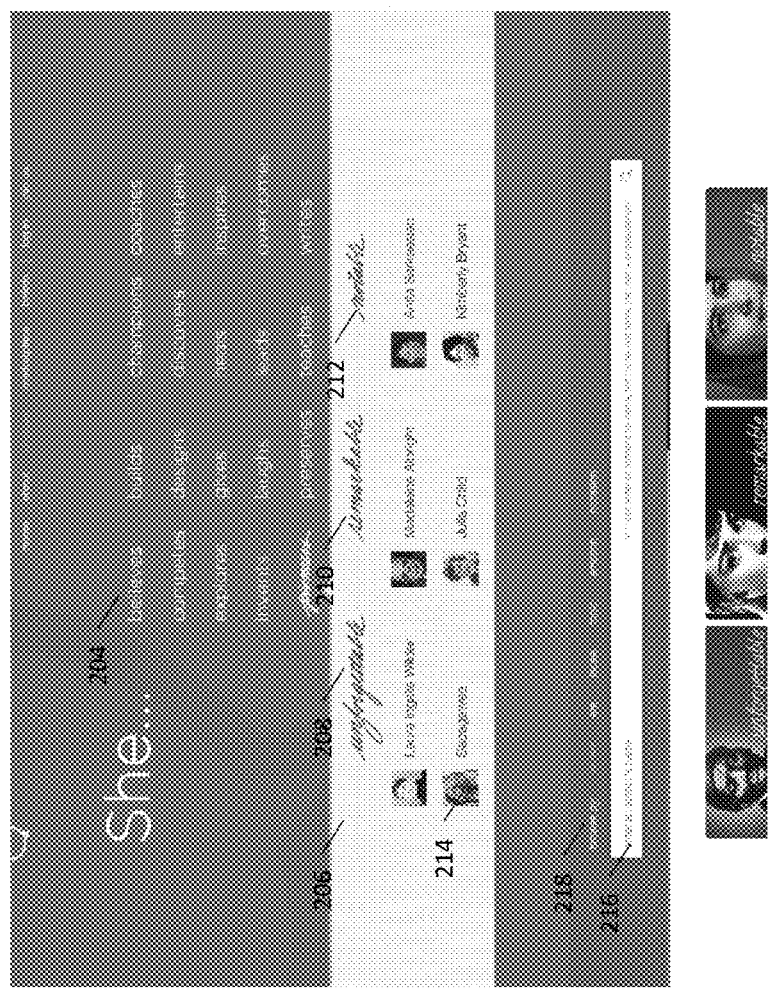
FIG. 2B depicts another example of another browsing interface for providing quote searching and browsing, according to an implementation of the invention.

FIG. 2B depicts another example of a browsing interface 200B for providing quote searching and browsing, according to an implementation of the invention. As depicted in 2B, browsing region 202 may display one or more starting points 206 for a user after selection of a descriptor 204. In one implementation, the starting points 206 may expand into three columns of suggested starting points. For example, each column may be groups into three categories based on unforgettable authors 208, remarkable authors 210, and notable authors 212. It should be appreciated that the columns may include various other categories included, but not limited to, historical authors, contemporary authors, unknown authors, themes, events, eras, and the like. For each starting point 206, a list of relevant authors 214 is provided for the user to browse. For example, if a user selects the "believe" descriptors, a starting point including a list of unforgettable authors, remarkable authors, and notable authors may be provided along with relevant authors associated with the believe category and categories.

In another implementation, a user may utilize a searching region 216 of the browsing interface 200A to search using one or more keywords. When searching, the user may select a category 218 associated with the searching region 218 to further narrow down the searching results. For example, a user may select the emotion category and search utilizing the keyword "kindness" to bring up all of the quotes which are related and/or include the word kindness and associated with the emotion category.

Figure 2C:
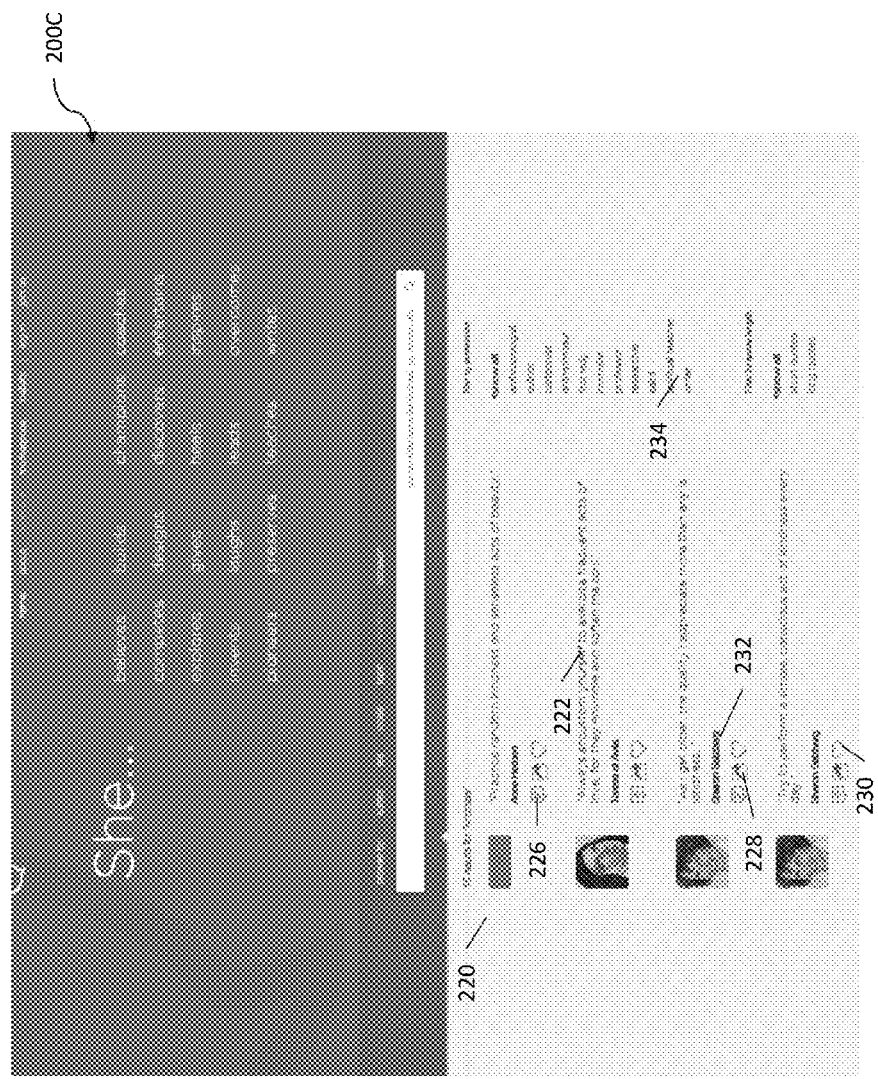
FIG. 2C depicts another example of another browsing interface for providing quote searching and browsing, according to an implementation of the invention.

FIG. 2C depicts another example of a browsing interface 200C for providing quote searching and browsing, according to an implementation of the invention. As depicted in FIG. 2C, the browsing region 202 may display search results 220 for the keyword search by a user. The search results 220 may include a list of quotes which are related and/or include the keyword and are associated with the selected category. The search results may include a quote profile 222 which includes the text of the quote 224, a comment function 226, a share function 228, a favorite function 230, author information 232 and the like. In another implementation, if the user searching via the author category, a list of authors including an author profile may be provided. The search results 220 may be further defined by a speaker type filter 234 which enables the user to display quotes by specified speaker types such as teachers, politicians, doctors, humanitarians, religious figures, and the like.

Figure 2D:
FIG. 2D depicts another example of another browsing interface for providing quote searching and browsing, according to an implementation of the invention.

FIG. 2D depicts another example of a browsing interface 200D for providing quote searching and browsing, according to an implementation of the invention. As depicted in FIG. 2D, the searching region 216 may include one or more searching sub-regions 236 for searching multiple categories 218. In one implementation, the searching sub-regions may enable the user to searching multiple categories 218 utilizing various keywords to refine a search. For example, a user may utilize the searching sub-regions to search the author category using the keyword "Albright" and the topic category using the keyword "politics" to provide quotes authored by Madeleine Albrights that relate to politics. In another implementation, the user may select searching sub-region may include a length of quote (long vs. short).

Figure 3:
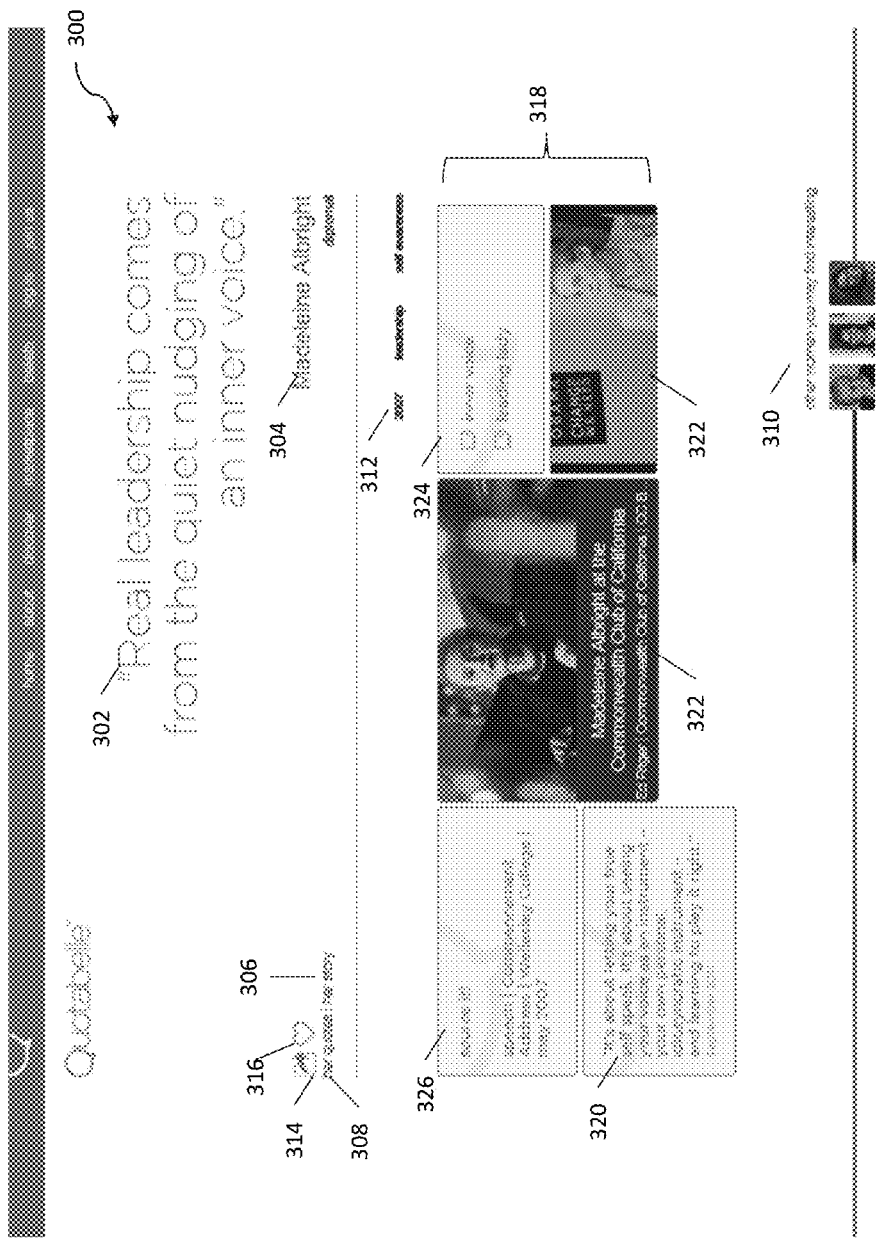
FIG. 3 depicts an example of a quote profile interface according to an implementation of the invention.
Figure 4A:
FIG. 4A depicts an example of an author profile interface according to an implementation of the invention.

FIG. 3 depicts an example of a quote profile interface 300 according to an implementation of the invention. The quote profile interface 300 may include the text of the quote 302, the author of the quote 304, a link to the story of the author 306 via the author profile, a link to more quotes by the author 308, source of the quote 326 (including the date, event, occasion) which links to the original sourced material for the quote and the like. In one implementation, the quote profile interface 300 may include recommendations 310 of other authors and quotes which share common views and values as the quote being viewed. In another implementation, the quote profile interface may 200 include categories associated with the quote 312, a share function 314, a favorite function 316, and the like. In another implementation, the quote profile interface 300 may include an author information region 318. The author information region 318 may include other related quotes 320 by the author, links to significant and/or historical events 322 associated with the author including pictures, video, audio, rich media files, and categories associated with the author 324. This enables the user to find other quotes and/or authors which may be of interest to further expand the user's knowledge of these exceptional people and events and their impact on society FIG. 4A depicts an example of an author profile interface 400A according to an implementation of the invention. The author profile interface 400A may include the name of the author 402, the author's biography 404, one or more pictures of the author 406, categories associated with the author 408, and the like. In one implementation, the author profile interface 400A may include links to additional information associated with the author. In one implementation, the author profile interface 400A may include a timeline 410 including the significant dates and events in the author's life. The timeline 410 may include the birth date 412, the date of death (if applicable), featured quotes of the author 414 and significant and/or historical events 416 associated with the author. In one implementation, the timeline 410 may include pictures, audio, video, and/or rich media files of the significant and/or historical events in the author's life. In one implementation, the elements of the timeline are mapped in a temporal manner starting with the birth of the authors and ending with the current date. For example, a timeline for Madeleine Albright may include featured quotes, pictures and videos of historical events associated with her life, audio of speeches in which a feature quote is made; and links to other biographical and historical information. For example, the author profile may include a links drawer which includes links to other sites or sources of information about the author or significant events in the author's life. In another implementation, the author profile interface 400A may include items or links to items 418 which are favored or made famous by the author and/or helps tell the story of the life of the author. In another implementation, author profile engine 126 may include the ability of the user to purchase 420 one or more of these items.

Figure 4B:
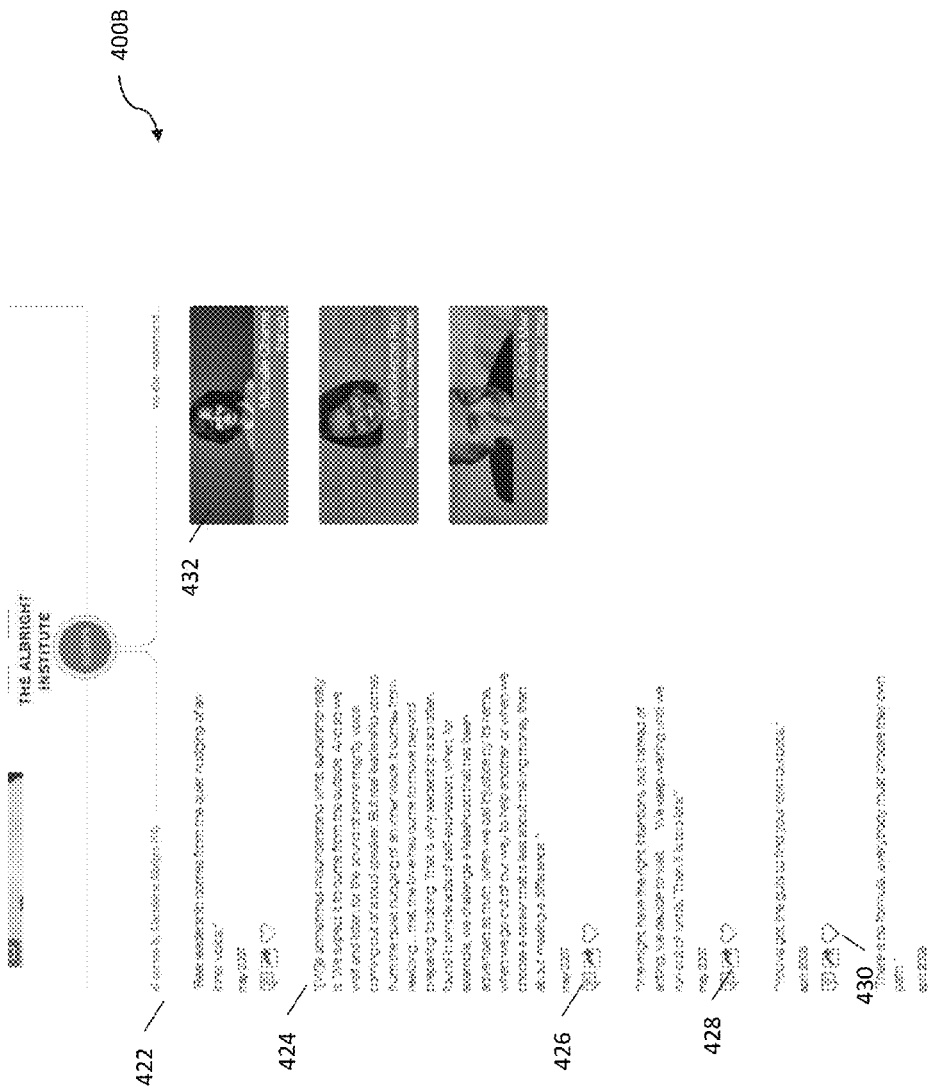
FIG. 4B depicts an example of another author profile interface according to an implementation of the invention.

FIG. 4B depicts another example of an author profile interface 400B according to an implementation of the invention. The author profile interface 400B may include a list of all of the quotes 422 by the particular author. The list of quotes 422 may include quote profiles 424 for each quote including the text of the quote 426, a comment function 428, a share function 430, a favorite function 430, and the like. The author profile interface 400B may also include a list of authors 432 which are similar to the author featured on the author profile interface.

Figure 5A:
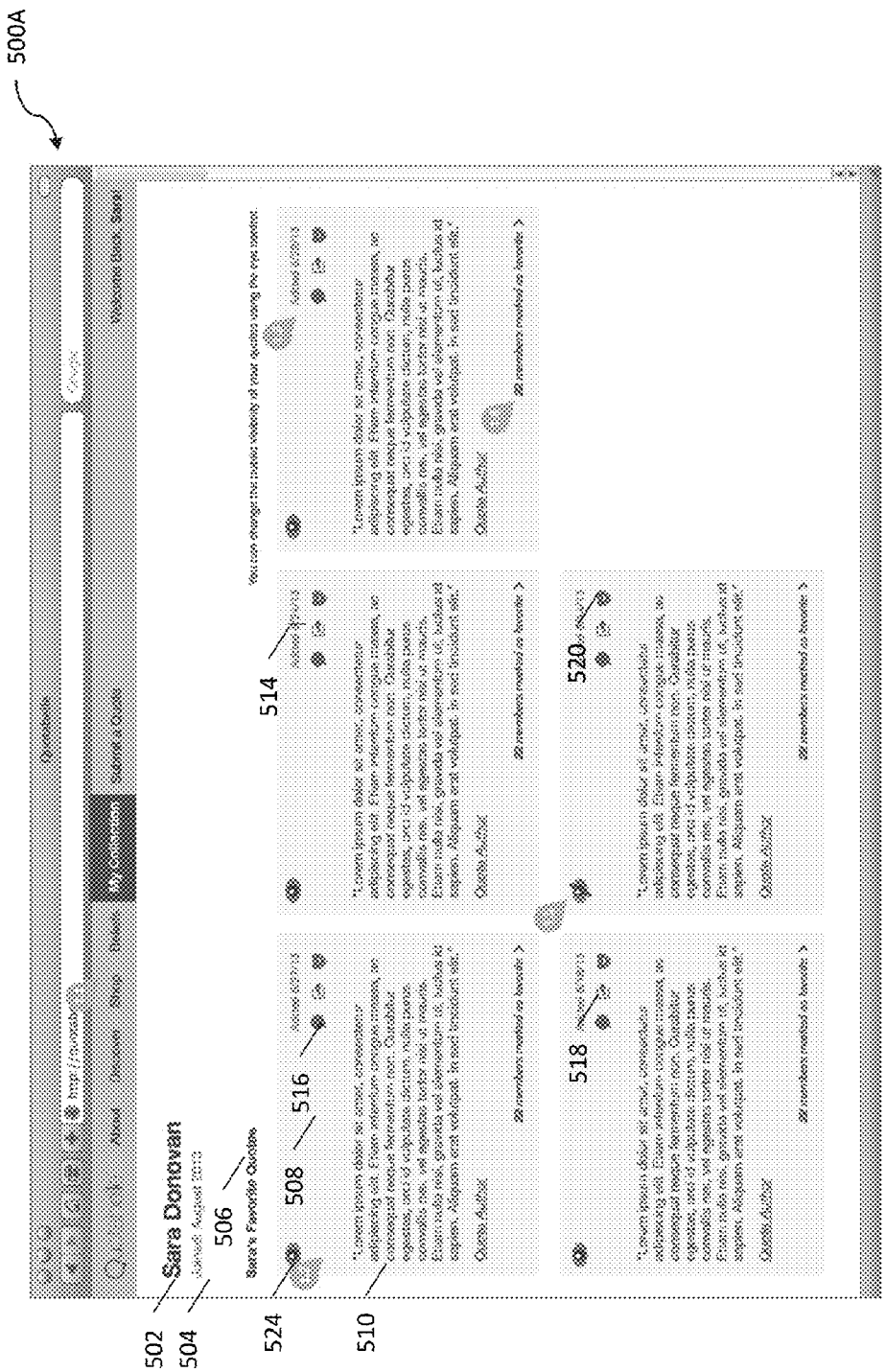
FIG. 5A depicts an example of a user profile interface according to an implementation of the invention.

FIG. 5A depicts an example of a user profile interface 500A according to an implementation of the invention. The user profile interface 500A may include the user name 502 and the start date of the user 504. In one implementation, the user profile interface 500A may include a favorite quote region 506. The favorite quote region 506 may display all of the quotes marked as favorites by the user. In one implementation, the quotes are provided in reverse chronological order based on the add date to the user's favorites. However, it should be appreciated that the order in which the quotes are provided may vary. In another implementation, each favorite quote 508 may include the actual quote text 510, author attribution 512, date added to favorite 514, a comment function 516, a share function 518 and a customize function 520. In one implementation, each favorite quote 508 may include a social function 522 which displays the number of users which also marked that particular quote as a favorite. In another implementation, each favorite quote 508 may include a visibility function 524 which enables the user to restrict the view of a favorite quote to a private view rather than a public view.

Figure 5B:
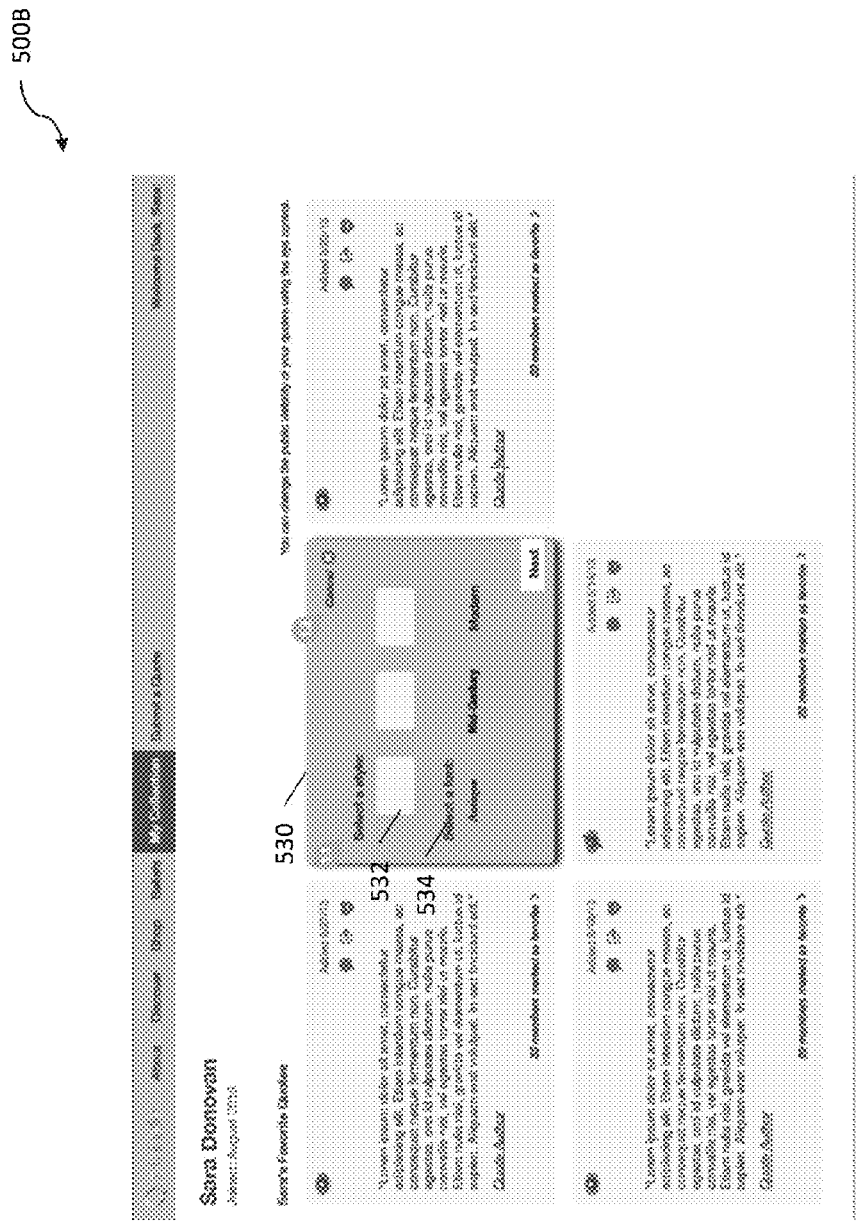
FIG. 5B depicts an example of another user profile interface according to an implementation of the invention.

FIG. 5B depicts an example of a user profile interface 500B according to an implementation of the invention. The user profile 500B may include a customization region 530 that enables the user to customize the appearance of each favorite quote. In one implementation, customization region 530 may include a style selection region 532 and a font selection region 534. As an example, a user may utilize the customization region 530 to apply a style and font to a particular quote. In one implementation, the customization region 530 may enable a user to customize the font, color, size, background, and the like of favorite quotes. For example, one or more images may be retrieved from an image library which may be used to customize the background of the favorite quotes using illustrations, photos, and other visuals.

Figure 5C:
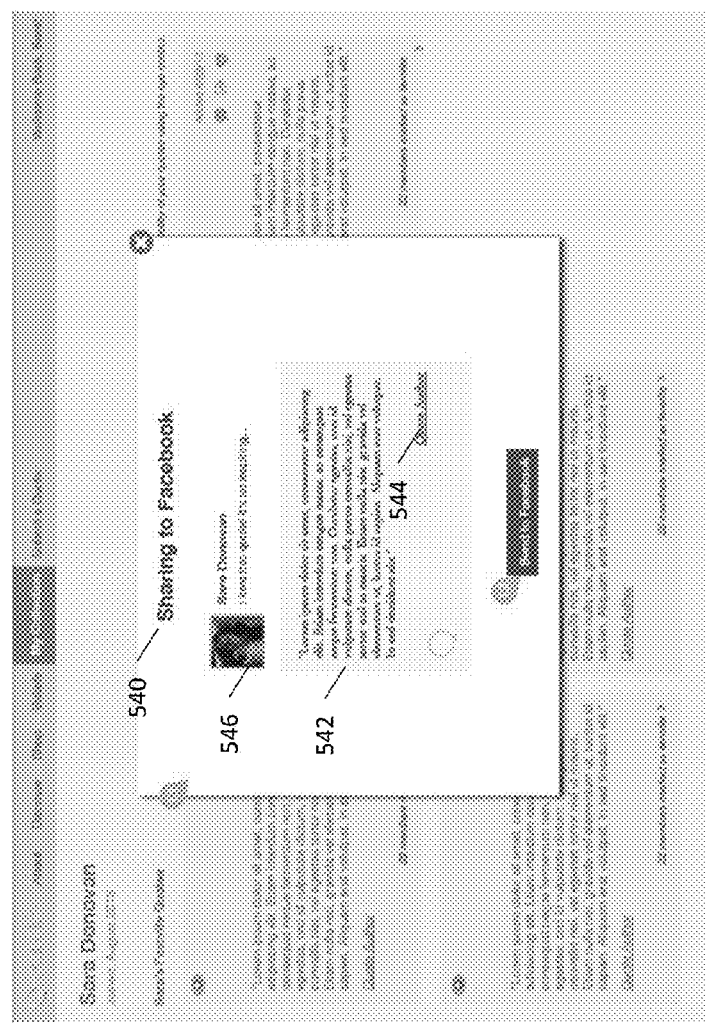
FIG. 5C depicts an example of a user profile interface 500C according to an implementation of the invention.

FIG. 5C depicts an example of a user profile interface 500C according to an implementation of the invention. The user profile 500C may include a sharing function region 540 that enables a user to share a favorite quote. The sharing function region 540 may include the text of the quote 542 and author 544 of the quote being shared. In one implementation, the text of the quote 542 is displayed using the customized appearance selected by the user. In another implementation, the sharing function region 540 may include a user message region 546 which enables the user to add a customized message to the quote being shared.

FIG. 6 depicts a process flow diagram 600 for a process of managing quotations, according to an implementation of the invention. The various processing operations and/or data flows depicted in FIG. 6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, a search criteria is received including one or more search elements corresponding to one or more quotes stored in a quote database from a user. A user search that relates one or more particular quotes, authors, categories of quotes, specific tag of a quote, and the like may be received and processed. The user search may include a search parameter used to obtain search results.

In an operation 604, a search of the quote database is executed with the one or more search elements. The user search may be processed to obtain results related to the user search. In an implementation, the user search may be processed using the exact words or phrases from the user search (e.g., using the exact words of the search parameter). In other implementations, the user search may be interpreted to determine user intent and then execute the search or command (or otherwise cause the search or command to be executed) based on the user intent.

In an operation 606, a result set of one or more quotes is generated that match the search criteria. In an implementation, a set of results may be provided based on a user search. In one implementation, the set of results may be provided based on a prioritization which likely represents the interests of the user. In an implementation, the set of results may be prioritized based on history information indicating one or more search of the user. In an implementation, the set of results may be prioritized based on the user search itself In an operation 608, the result set is provided for presentation to the user. In an implementation, a set of results may be provided based on a user search.

In an operation 610, a quote profile interface is provided for presentation to the user. In an implementation, a quote profile may be generated for each quote. Each quote profile may display information relating to the quote including, but not limited to, actual quote text, quote date, category of quote, quote era, author of the quote, related descriptive words associated with each quote, images related to the quote, videos related to the quote, webpage links related to the quote and source of the quote, related author information, significant historical information associated with the quote, and the like.

In an operation 612, an author profile interface is provided for presentation to the user. In an implementation, user may be directed to an author's profile interface containing all the relevant author information and quotes by the author. In another implementation, for a category search, a set of results may be provided displaying quotes related to the category in reverse chronological order based on era. In an implementation, a timeline may be generated for the author including featured quotes by the author; pictures, videos, audio, rich media files, and the like of significant events in the author life. In one implementation, the timeline may be provided such that all of the elements associated with the timeline are mapped in a temporal manner In an operation 614, a user profiler interface is provided for presentation to the user. In an implementation, a user profile page may be generated for each registered user. Each user profile may display information related to the user including, but not limited to favorite quotes, membership start date; functions attached to the quotes, and the like. In one implementation, a user profile includes a list of favorite quotes previously selected as a favorite by the user.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for managing quotes from a literary work or statements by authors, using a quote management computer system having one or more physical processors programmed with computer program instructions stored on a non-transitory computer readable medium which, when executed, perform the method, the method comprising:

causing, by the computer system, author profiles to be stored, the author profiles including timeline information corresponding to events in an author's life;

receiving, at the computer system, from a user, a search criteria including one or more search elements corresponding to one or more quotes stored in a quote database;

executing, by the computer system, a search of the quote database with the one or more search elements;

generating, by the computer system, a result set of one or more quotes, one or more authors, or one or more categories that match the search criteria;

generating, by the computer system, an interactive, computer generated interface display including (1) the result set, (2) an author profile, from among the author profiles, the author profile displaying: information relating to an author of the one or more quotes; and a timeline including information icons associated with the one or more quotes made by the author and significant events in the author's life, and (3) display options to enable a user to interact with the one or more quotes, the display options including:
i) a quote sharing tool, including tools within the interface to enable the user to format a first quote, from among the one or more quotes, for sharing; and ii) a quote favorite tool to enable the user to select the first quote as a favorite; and in response to receiving a selection, from the user, of the first quote as a favorite, storing, in a user profile accessible to the computer system, an indication that the user selected the first quote as a favorite.

2. The method according to claim 1, wherein the information icons include an audio file, an image, a video file, or links to information and articles related to the author and the significant events.

3. The method of claim 1, the method further comprising:
providing, by the computer system, the user profile to the user;
wherein the user profile displays a user's profile information and favorite quotes.

4. The method of claim 3, wherein each of the user's favorite quotes include text of the favorite quote, author attribution of the favorite quote, a link to a quote profile associated with the favorite quote, a link to an author profile associated with the attributed author, and a link to a sharing interface.

5. The method of claim 1, the method further comprising:
providing, by the computer system, a messaging interface to include a personal message with a social media post used to share the first quote and a customization interface to enable to the user to customize the font and style of the first quote.

6. The method of claim 1, wherein the information icons include an audio file, an image, a video file, or links to information and articles related to the author and the significant events.

7. The method of claim 1, the method further comprising:
providing, by the computer system, a subscription interface to the user;
wherein the subscription interface periodically provides the user one or more other quotes based on one or more subscription criteria.

8. The method according to claim 1, the method further comprising:
providing, by the computer system, a quote profile to the user;
wherein the quote profile displays information associated with a quote including the source of the quote, author of the quote, date of the quote, category of the quote, and information items related to the quote.

9. A system for managing quotes from a literary work or statements by author, using a quote management, the system comprising:
a computer system having one or more physical processors programmed with computer program instructions stored on a non-transitory computer readable medium to:
cause author profiles to be stored, the author profiles including timeline information corresponding to events in an author's life;
receive, from a user, a search criteria including one or more search elements corresponding to one or more quotes stored in a quote database;
execute a search of the quote database with the one or more search elements;
generate a result set of one or more quotes, one or more authors, or one or more categories that match the search criteria;
generate an interactive, computer generated interface display including (1) the result set, (2) an author profile, from among the author profiles, the author profile displaying: information relating to an author of the one or more quotes; and a timeline including information icons associated with the one or more quotes made by the author and significant events in the author's life, and (3) display options to enable a user to interact with the one or more quotes, the display options including:
i) a quote sharing tool, including tools within the interface to enable the user to format a first quote, from among the one or more quotes, for sharing; and ii) a quote favorite tool to enable a user to select the first quote as a favorite; and in response to receipt of a selection, from the user, of the first quote as a favorite, storing, in a user profile accessible to the computer system, an indication that the user selected the first quote as a favorite.

10. The system of claim 9, wherein the processors are further programmed to:
provide a user profile to the user;
wherein the user profile displays a user's profile information and favorite quotes.

11. The system of claim 10, wherein each of the user's favorite quotes include text of the favorite quote, author attribution of the favorite quote, a link to a quote profile associated with the favorite quote, a link to an author profile associated with the attributed author, and a link to a sharing interface.

12. The system of claim 9, wherein the processors are further programmed to:
provide a sharing interface enabling the user to post one or more quotes on social media, the sharing interface including a messaging interface to include a personal message with the post and a customization interface to enable to the user to customize the font and style of the quotes.

13. The system of claim 9, wherein the processors are further programmed to:
provide an author profile to the user;
wherein the author profile displays biographical information associated with an author, a listing of quotes made by the author, and categories associated with the author.

14. The system according to claim 9, wherein the information icons include an audio file, an image, a video file, or links to information and articles related to the author and the significant events.

15. The system according to claim 9, where the one or more processors are further programmed to:
provide a subscription interface to the user;
wherein the subscription interface periodically provides the user one or more quotes based on one or more subscription criteria.

16. A method for managing quotations from a literary work or statements by authors, using a quote management computer system having one or more physical processors programmed with computer program instructions stored on a non-transitory computer readable medium which, when executed, perform the method, the method comprising:
storing quotations in a quote database accessible to the computer system;
causing, by the computer system, author profiles to be stored, the author profiles including timeline information corresponding to events in an author's life;

causing, by the computer system, in association with an individual one of the quotations, a quote profile, the quote profile including an identification of an author of a quote;

in response to receiving, at the computer system, a search request with quote search elements, generating an interactive, computer generated interface display including:

at least a first quote corresponding to the search elements;

first author information, for a first author of the first quote, based on stored author profile information for the first author;

display options to enable a user to interact with the first quote, the display options including:

i) a quote sharing tool, including tools within the interface to enable the user to format the first quote for sharing; and ii) a quote favorite tool to enable the user to select the first quote as a favorite;

in response to receiving a selection, from the user, of the first quote as a favorite, storing, in a user profile accessible to the computer system, an indication that user selected the first quote as a favorite.

17. The method of claim 16, wherein the search elements include a keyword associated with text of a quote, an author of a quote, or a category of a quote.

18. The method of claim 16, further comprising:
providing, by the computer system, a user profile to the user;
wherein the user profile displays a user's profile information and favorite quotes.

19. The method of claim 18, wherein each of the user's favorite quotes include text of the favorite quote, author attribution of the favorite quote, a link to a quote profile associated with the favorite quote, a link to an author profile associated with the attributed author, and a link to a sharing interface.

20. The method according claim 19, further comprising:
providing, by the computer system, a sharing interface enabling the user to post one or more quotes on social media, the sharing interface including a messaging interface to include a personal message with the post and a customization interface to enable the user to customize the one or more posted quotes.

21. The method of claim 20, wherein the quote sharing tool comprises elements for enabling the user to customize the font and style of the text of the one or more posted quotes.

22. The method according to claim 16, further comprising:
providing, by the computer system, a browsing interface to the user;
wherein the browsing interface displays one or more categories associated with the one or more quotes stored in the quote database.

23. The method according to claim 22, wherein the browsing interface enables the user to select one or more categories to narrow the search of the quote database.

24. The method according to claim 22, wherein the browsing interface provides one or more historical authors, one or more contemporary authors, or one or more famous authors for each category.

25. The method according to claim 16, further comprising:
providing, by the computer system, the author profile to the user;
wherein the author profile displays biographical information associated with an author, a listing of quotes made by the author, and categories associated with the author.

26. The method according to claim 16, further comprising:
providing, by the computer system, a subscription interface to the user;
wherein the subscription interface periodically provides the user one or more quotes based on one or more subscription criteria.

27. The method according to claim 16,
providing, by the computer system, a quote profile to the user;
wherein the quote profile displays information associated with a quote including the source of the quote, author of the quote, date of the quote, category of the quote, and information items related to the quote.

* * * * *